US008984149B1

(12) United States Patent
Martini

(10) Patent No.: US 8,984,149 B1
(45) Date of Patent: Mar. 17, 2015

(54) APPLYING POLICIES TO SUBNETS

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/199,616

(22) Filed: Mar. 6, 2014

(51) Int. Cl.
*G06F 15/16* (2006.01)
*H04L 12/24* (2006.01)

(52) U.S. Cl.
CPC ..................................... *H04L 41/50* (2013.01)
USPC ........................................................ 709/228

(58) Field of Classification Search
None
See application file for complete search history.

(56) References Cited

U.S. PATENT DOCUMENTS

| | | | | | |
|---|---|---|---|---|---|
| 5,748,619 | A | * | 5/1998 | Meier | 370/278 |
| 7,570,625 | B1 | * | 8/2009 | Ocepek | 370/338 |
| 8,566,452 | B1 | * | 10/2013 | Goodwin et al. | 709/227 |
| 2002/0075844 | A1 | * | 6/2002 | Hagen | 370/351 |
| 2003/0091014 | A1 | * | 5/2003 | Meier | 370/338 |
| 2003/0219030 | A1 | * | 11/2003 | Gubbi | 370/442 |
| 2005/0185626 | A1 | * | 8/2005 | Meier et al. | 370/338 |
| 2006/0282660 | A1 | * | 12/2006 | Varghese et al. | 713/155 |
| 2007/0150732 | A1 | * | 6/2007 | Suzuki et al. | 713/168 |
| 2008/0250478 | A1 | * | 10/2008 | Miller et al. | 726/5 |
| 2013/0322255 | A1 | * | 12/2013 | Dillon | 370/236 |

OTHER PUBLICATIONS

Cisco, "Cisco ASA CX Content-Aware Security FAQ" 2013, downloaded from the internet at: http://www.cisco.com/en/US/prod/collateral/vpndevc/ps6032/ps6094/ps6120/qa_c67-700607.html on Dec. 23, 2013, 3 pages.
Smith, Content Filtering-Basic Configuration, Jul. 8, 2013, downloaded from the internet at: http://support.cipafilter.com/index.php?/Knowledgebase/Articie/View/12/8/1—content-filtering—basic-configuration on Dec. 23, 2013, 2 pages.

* cited by examiner

*Primary Examiner* — Scott Christensen
(74) *Attorney, Agent, or Firm* — Fish & Richardson P.C.

(57) ABSTRACT

Associations are maintained among a plurality of subnets, policies, and client types. Each subnet has an associated client type and policy. For a particular client device, (i) a client type of the particular client device, and (ii) a client type associated with the subnet on which the particular client device is hosted is determined. For the particular client device, (i) the determined client type of the particular client device with (ii) the determined client type associated with the subnet on which the particular client device is hosted is compared. Responsive to a determination that the client type of the particular client device matches the client type associated with the subnet that hosts the particular client device, a policy is applied to the particular client device.

19 Claims, 5 Drawing Sheets

APPLYING POLICIES TO SUBNETS

The present document relates to computer networking

BACKGROUND

A computer network is a collection of computers and other hardware interconnected by communication channels that allow sharing of resources and information. Communication protocols define the rules and data formats for exchanging information in a computer network. Computer networks can be logically divided into subnetworks, sometimes called subnets. The subnets of a computer network, and the machines on the subnets, may share the same hardware resources, but may have different permissions and policies, depending on the subnet.

SUMMARY

In one aspect, a method is performed by data apparatus. The method includes maintaining associations among a plurality of subnets of a network, a plurality of policies, and a plurality of client types. Each subnet has an associated client type and an associated policy. The method further includes determining, for a particular client device, (i) a client type of the particular client device, and (ii) a client type associated with the subnet on which the particular client device is hosted. The method further includes comparing, for the particular client device, (i) the determined client type of the particular client device with (ii) the determined client type associated with the subnet on which the particular client device is hosted. The method further includes responsive to a determination that the client type of the particular client device matches the client type associated with the subnet that hosts the particular client device, applying, to the particular client device, the policy associated with the subnet that hosts the particular client device.

Implementations can include any, all, or none of the following features. The method includes, responsive to a determination that the client type of the particular client device does not match the client type associated with the subnet that hosts the particular client device, apply a corrective action to the second particular device. The corrective action is one of the group consisting of removing the second particular client device from the network, moving the second particular client device to a different subnet, and generating an alert that identifies the second particular client device, redirecting a request from the particular client device to a webpage, and blocking access to the first subnet. Maintaining associations among a plurality of subnets of a network, a plurality of policies, and a plurality of client types includes maintaining associations among a plurality of subnets of a network, a plurality of policies, and a plurality of client types and a plurality of parameters, wherein each client type has an associated parameter; and wherein determining, for a particular client device, (i) a client type of the particular client device, and (ii) a client type associated with the subnet on which the particular client device is hosted includes passively monitoring network traffic of the client devices; examining a parameter of the passively monitored network traffic; and comparing the parameter of the passively monitored network traffic with the third data. The parameter of the passively monitored network traffic is a User-Agent header. Determining, for a particular client device, (i) a client type of the particular client device, and (ii) a client type associated with the subnet on which the particular client device is hosted includes redirecting at least some network traffic of the client devices to a server on the network; receiving, at the server on the network, the redirected traffic; and examining a parameter of the redirected traffic. The parameter of the redirected traffic is a cookie. The server is a transparent proxy configured to transparently route the redirected traffic to the redirected traffic's original destination. The network includes a first subnet and a second subnet; stationary clients are associated with the first subnet; bring-your-own-device clients are associated with the second subnet; and a more restrictive policy is associated with the second subnet and a less restrictive policy is associated with the first subnet. The data apparatus includes a plurality of hardware devices, each hardware device include a separate processor and memory unit; wherein a first hardware devices is configured to route traffic to and from the client devices into and out of the network; and wherein a second hardware device is configured to perform the steps of: maintaining associations among a plurality of subnets of a network, a plurality of policies, and a plurality of client types, wherein each subnet has an associated client type and an associated policy; determining, for a particular client device, (i) a client type of the particular client device, and (ii) a client type associated with the subnet on which the particular client device is hosted; comparing, for the particular client device, (i) the determined client type of the particular client device with (ii) the determined client type associated with the subnet on which the particular client device is hosted; and responsive to a determination that the client type of the particular client device matches the client type associated with the subnet that hosts the particular client device, applying, to the particular client device, the policy associated with the subnet that hosts the particular client device.

In one aspect, a computer storage media is encoded with computer program instructions that, when executed by one or more processors, cause a computer device to perform operations including maintaining associations among a plurality of subnets of a network, a plurality of policies, and a plurality of client types. Each subnet has an associated client type and an associated policy. The operations further include determining, for a particular client device, (i) a client type of the particular client device, and (ii) a client type associated with the subnet on which the particular client device is hosted. The operations further include comparing, for the particular client device, (i) the determined client type of the particular client device with (ii) the determined client type associated with the subnet on which the particular client device is hosted. The operations further include responsive to a determination that the client type of the particular client device matches the client type associated with the subnet that hosts the particular client device, applying, to the particular client device, the policy associated with the subnet that hosts the particular client device.

Implementations can include any, all, or none of the following features. The operations further include responsive to a determination that the client type of the particular client device does not match the client type associated with the subnet that hosts the particular client device, apply a corrective action to the second particular device. Maintaining associations among a plurality of subnets of a network, a plurality of policies, and a plurality of client types includes maintaining associations among a plurality of subnets of a network, a plurality of policies, and a plurality of client types and a plurality of parameters, wherein each client type has an associated parameter; and wherein determining, for a particular client device, (i) a client type of the particular client device, and (ii) a client type associated with the subnet on which the particular client device is hosted includes passively monitoring network traffic of the client devices; examining a parameter of the passively monitored network traffic; and comparing the parameter of the passively monitored network traffic with the third data. Determining, for a particular client device, (i) a client type of the particular client device, and (ii) a client type associated with the subnet on which the particular client device is hosted includes redirecting at least some network traffic of the client devices to a server on the network; receiving, at the server on the network, the redirected traffic; and examining a parameter of the redirected traffic. The server is a transparent proxy configured to transparently route the redirected traffic to the redirected traffic's original destination.

In one aspect, a system includes one or more processors configured to execute computer program instructions. The system further includes computer storage media encoded with computer program instructions that, when executed by one or more processors, cause a computer device to perform operations including maintaining associations among a plurality of subnets of a network, a plurality of policies, and a plurality of client types. Each subnet has an associated client type and an associated policy. The operations further include determining, for a particular client device, (i) a client type of the particular client device, and (ii) a client type associated with the subnet on which the particular client device is hosted. The operations further include comparing, for the particular client device, (i) the determined client type of the particular client device with (ii) the determined client type associated with the subnet on which the particular client device is hosted. The operations further include responsive to a determination that the client type of the particular client device matches the client type associated with the subnet that hosts the particular client device, applying, to the particular client device, the policy associated with the subnet that hosts the particular client device.

Implementations can include any, all, or none of the following features. The operations further include responsive to a determination that the client type of the particular client device does not match the client type associated with the subnet that hosts the particular client device, apply a corrective action to the second particular device. Maintaining associations among a plurality of subnets of a network, a plurality of policies, and a plurality of client types includes maintaining associations among a plurality of subnets of a network, a plurality of policies, and a plurality of client types and a plurality of parameters, wherein each client type has an associated parameter; and wherein determining, for a particular client device, (i) a client type of the particular client device, and (ii) a client type associated with the subnet on which the particular client device is hosted includes passively monitoring network traffic of the client devices; examining a parameter of the passively monitored network traffic; and comparing the parameter of the passively monitored network traffic with the third data. Determining, for a particular client device, (i) a client type of the particular client device, and (ii) a client type associated with the subnet on which the particular client device is hosted includes redirecting at least some network traffic of the client devices to a server on the network; receiving, at the server on the network, the redirected traffic; and examining a parameter of the redirected traffic. The server is a transparent proxy configured to transparently route the redirected traffic to the redirected traffic's original destination.

Implementations can include any, all, or none of the following features.

The systems and processes described here may be used to provide a number of potential advantages. By monitoring the network traffic of clients on a network, a device can determine if the clients of the network are on the appropriate subnets of the network. This verification can be used when applying policies to the devices of a subnet to ensure that the proper policies are applied to the devices. Devices found to be on the incorrect subnet may be reassigned to the correct subnet.

Other features, aspects and potential advantages will be apparent from the accompanying description and figures.

DESCRIPTION OF DRAWINGS

Like reference symbols in the various drawings indicate like elements

DETAILED DESCRIPTION

A network administrator may partition a network into subnets for a number of reasons. For example, a corporate network may have a subnet for servers, a subnet for client machines, and a subnet for portable devices (e.g., bring-your-own devices). When a device joins the network, the device can be compared to the rules for each subnet and placed in the associated subnet. However, the subnet assignment process may not be perfect, and devices may be assigned or moved to the incorrect subnet.

When a device is on the incorrect subnet, proper administration may be made more difficult and/or the network may be exposed to security vulnerabilities. To determine if a device is in the proper subnet, a gateway or other device on the network may monitor traffic of the devices to determine the devices' profiles. These profiles may then be compared to the profiles for each subnet. If a device is found to be on the proper network, it can be given the policies of the subnet. When a conflict is found, corrective action can be taken (e.g., the device can be reassigned to the correct subnet).

Figure 1:
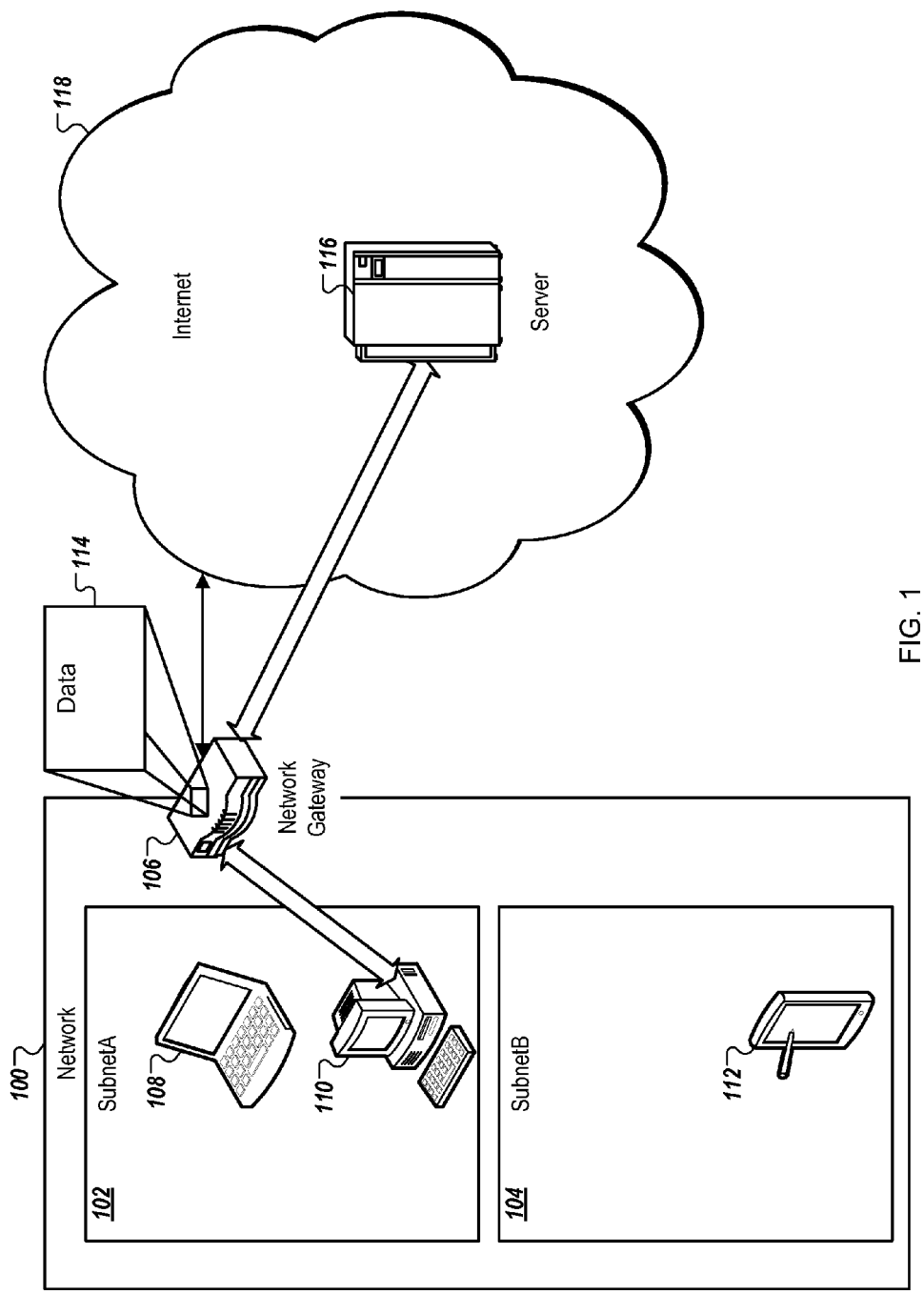
FIG. 1 is a block diagram of an example network that applies different policies to different subnets.

FIG. 1 is a block diagram of an example network 100 that applies different policies to different subnets. The network 100 includes subnets 102 and 104, a network gateway 106, and client devices 108-112, which represents any appropriate computing devices capable of browsing resources inside or outside of the network 100. While not shown for clarity's sake, the network 100 can include other elements including, but not limited to, wireless and/or wired access points, file and/or application servers, routers, and network cables, as well as additional client devices and network gateways.

The network 100 can be configured to route some or all of the traffic into and out of the network 100 through the gateway 106. For example, the gateway 106 may inspect network traffic to enforce security policies, prevent malicious software from entering the network, etc. Additionally, the gateway 106 may provide directory services for the clients of the network 100 (e.g., ApacheDS, Active Directory), may apply security policies to devices on the network 100, and may assign the client devices 108-112 to subnets 102 and 104.

For example, when the client device 110 boots up and logs onto the network 100, the gateway 106 may use information from the directory service, metadata stored about the client device 110, and/or messages from the client device 110 to determine a profile of the client device 110. The profile may specify, for example, the user that logged into the client device 110, the media access control (MAC) address of the client device 110, and/or the network name of the client device 110. The gateway 106 can compare this profile with subnet profiles stored in data 114 and identify a matching subnet, in this example, the subnet 110. In response, the gateway 106 can assign the client device 110 to the subnet 102.

Once assigned to the subnet 102, the network gateway can monitor the client device 110 to ensure that it is on the correct subnet. This monitoring may be configured to occur in response to assigning a client device to a subnet, or at other times (e.g., on a regular interval or as spare resources are available). For example, the client device 110 may request a resource from a server 116 on the Internet 118 or a resource on the network 100. The gateway 106, through which this traffic is routed, can monitor the traffic to determine if the client device 110 is on the correct subnet. For example, the gateway 106 can create another profile, which may include the same or different information as the previous profile created, based on the traffic. If the traffic profile matches the requirements of the subnet 102, the gateway 106 can determine that the client device 110 is on the correct subnet. If the traffic profile does not match the requirements of the subnet 102, the gateway 106 can determine that the client device 110 is not on the correct subnet. If the gateway 106 determines that the client device 110 is not on the correct subnet, it may take corrective action (e.g., remove the client device 110 from the subnet 102 or from the network 100).

When the gateway 106 assigns a client device to a subnet, it may or it may not apply some or all of the policies of the subnet to the client device. For example, when the gateway 106 assigns the client device 110 to the subnet 102, the gateway 106 may apply some or all of the policies of the subnet 102 to the client device 110. Some or all of these policies may be flagged by the network gateway 106 as provisional, and the network gateway 106 may handle provisional policies different than non-provisional policies. For example, traffic that applies to provisional policies may be given greater scrutiny for security vulnerabilities. In some cases, the gateway 106 may refrain from assigning some or all of the policies of the subnet 102 to the client device 110 until a traffic profile is created and analyzed for the client device 110.

Figure 2:
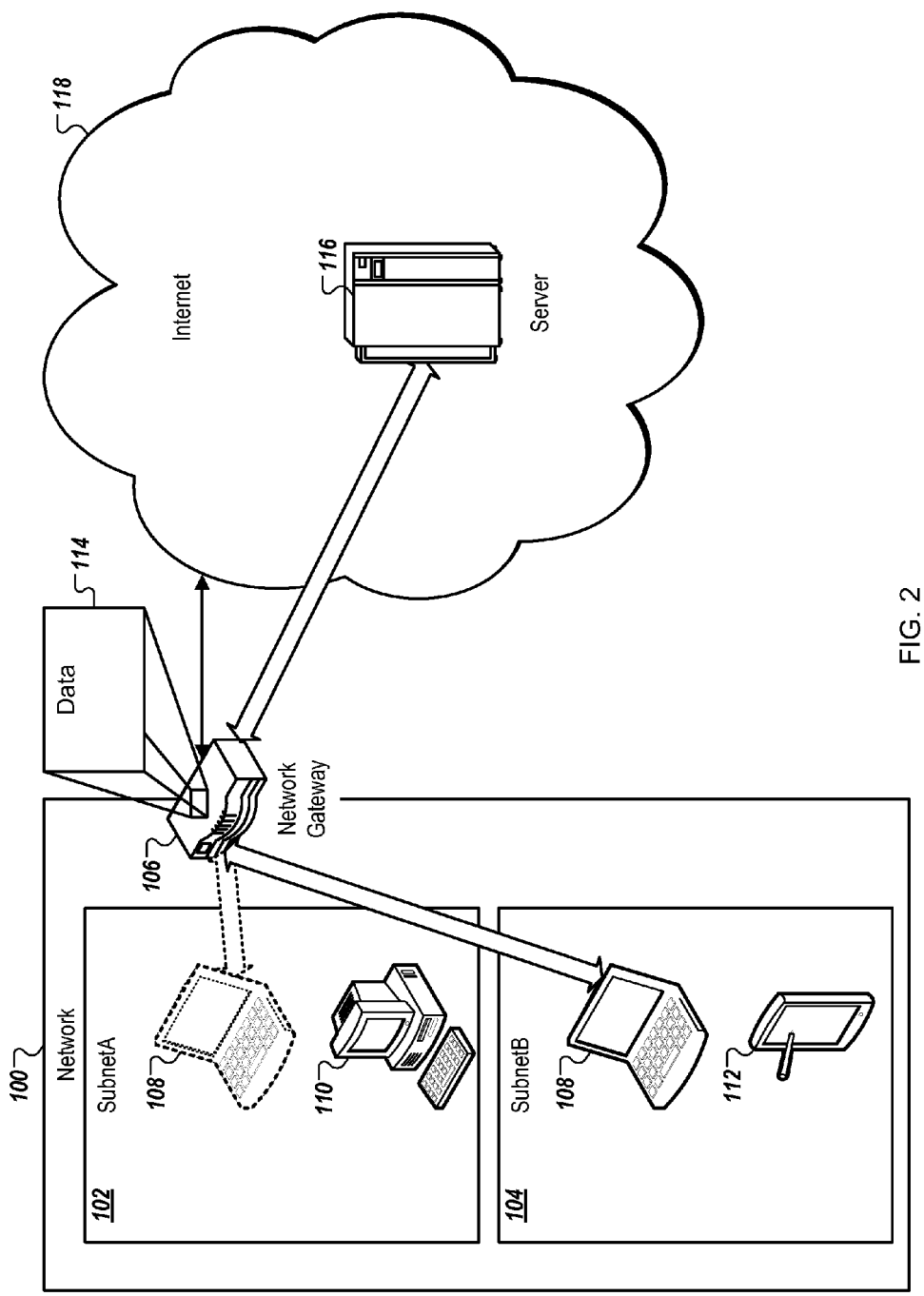
FIG. 2 is a block diagram of an example network with devices on different subnets.

FIG. 2 is a block diagram of the network 100 with devices on different subnets. As will be discussed, the gateway 106 will determine that the client device 108 is on the wrong subnet and will take corrective action.

In this example, the subnet 102 is configured to host stationary desktops owned and administered by the same party that owns and administers the network 100. The subnet 104 is configured to host mobile devices owned by their users. The subnet 104 may have stricter or more lax security policies. These devices are sometimes called "bring-your-own" devices. The client device 108 is one such bring-your-own device, and it has erroneously been assigned to the subnet 102. This may be due to a misconfiguration of the client device 108 or the gateway 106.

When the client device 108 attempts to access a resource on the server 116 on the Internet 118 or within the network 100, the gateway 106 can monitor the traffic and create a traffic profile for the client device 108 and compare the traffic profile with the configuration of the network 102. In this example, the gateway 106 can determine that the client device 108 is not a stationary client device for which the subnet 102 is configured, but a-bring-your own device that should be hosted on the subnet 104.

In response to this determination, the gateway 106 can take corrective action. The gateway 106 can generate an alert that identifies the client device 108. This alert may include an email or a ticket in an issue tracking system sent to the administrator of the network 100 and/or may include a message sent to the client device 108 to be displayed to the user of the client device 108. The gateway 106 may also or alternatively reassign the client device 108 to a different subnet. In this example, the gateway 106 may compare the traffic profile of the client device 108 with the profiles associated with each subnet. The gateway 106 may also or alternatively redirect current or future requests to a webpage. This webpage, for example, may contain text alerting the user to the fact that their device is on the wrong subnet. The gateway 106 may also or alternatively block access to the subnet. The gateway 106 may determine that the client device 108 matches the subnet 104. In response, the gateway 106 can move the client device 108 to the subnet 104. In another example, the gateway 106 may be configured to move any client device determined to be on the wrong subnet onto a special-purpose subnet configured to host clients determined to be on the wrong subnet. This configuration may be useful, for example, for hosting clients as they are being investigated to determine how they ended up on the wrong subnet, and/or if the network 100 hosts particularly sensitive data or other resources subject to strict security protocols.

Figure 3:
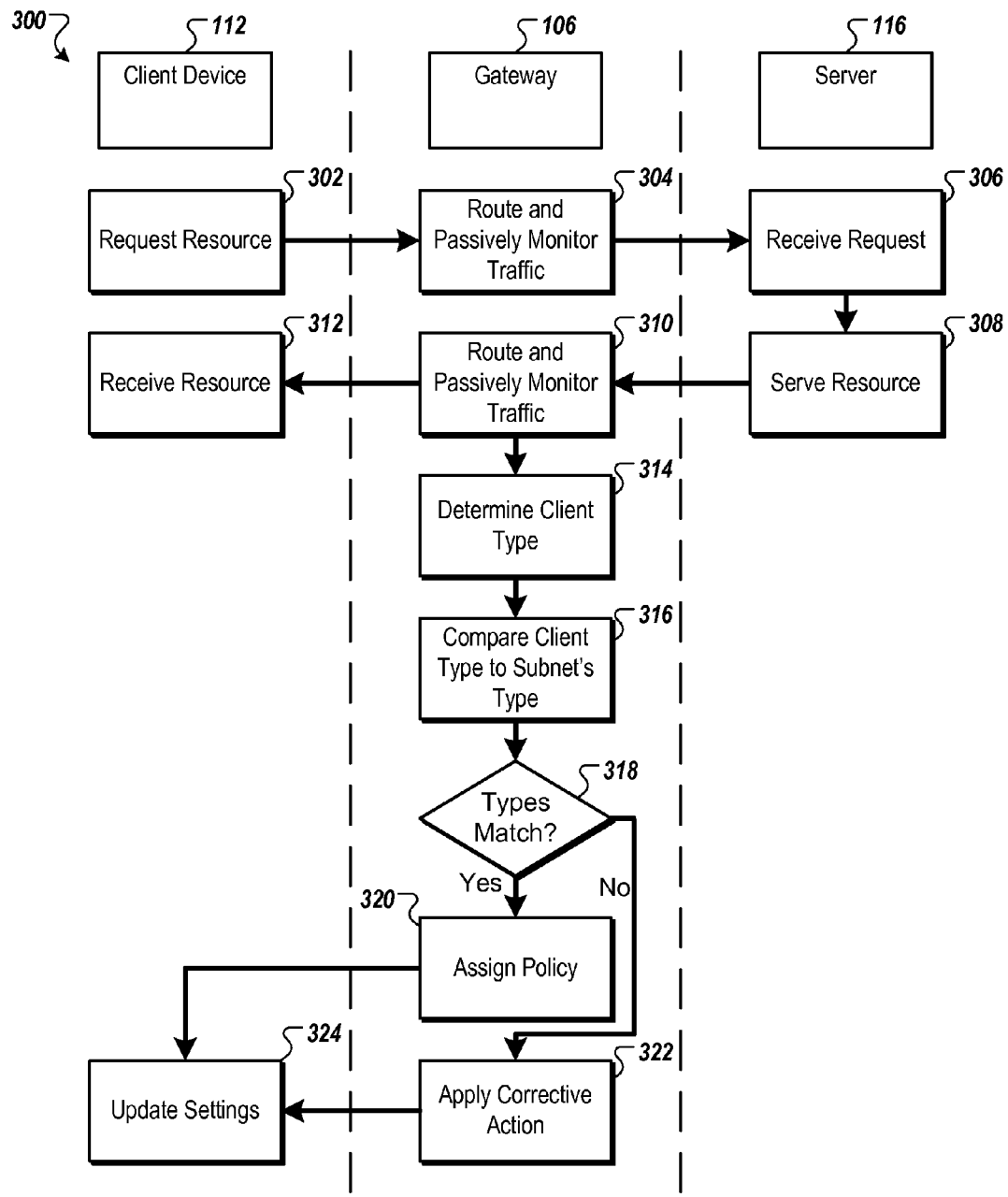
FIG. 3 is a swim-lane diagram of an example process for applying policies to devices on subnets.

FIG. 3 is a swim-lane diagram of an example process 300 for applying policies to devices on subnets. The process 300 is described with reference to the elements of network 100 of FIGS. 1 and 2. However, other components, including but not limited to the components shown in FIG. 4, can be used to perform the process 300.

The client device 112 creates a request for a resource (302). For example, the client device 112 may generate a request to access a webpage, email inbox, or gaming service provided by the server 116. The client device can send this request to the gateway 106 and the gateway 106 routes and passively monitors the request (304). For example, the gateway 106 can keep a log of the traffic between the client device 112 and any other network destination, including the server 116. The server 116 receives the request (116) and serves the request (308). The gateway routes and passively monitors the returned resource (310). For example, this traffic may be logged with the previously described traffic, and the gateway 106 can pass the resource client device 112. The client device 112 receives the resource (312).

The gateway determines the type of the client 108 (314). At any point during this communication routing, the gateway 106 can examine the passively collected traffic log to determine the type of the client 108. For example, the gateway 106 can examine each log entry as it is added to the log to determine if enough information is available to classify the client device 112. In another example, the gateway 106 may be configured to determine the client's type on a regular or irregular basis. This regular basis may be time-based (e.g., once a day), event based (e.g., on request to a particular type of resource), based on system resources (e.g., when the gateway has spare processor and disk-reading resources), or based on some other metric.

The possible client types may depend on the configuration of the network 100 and/or the subnets 102 and 104. For example, if the subnets are partitioned based on the operating system of the client devices, the client types may include the operating system of the client devices. If the subnets are partitioned based on the ownership of the devices, the client type can include data indicating the ownership of the client devices. In some cases, the gateway 106 may use one or more parameters of the traffic to identify the client device's 112 type. For example, Hypertext Transfer Protocol (HTTP) traffic can include a User-Agent string that specifies a browser or operating system of the client device 112, and the gateway 106 may use the User-Agent string to determine the client device's 112 type.

The gateway compares the client type with the client type of the subnet (316). For example, gateway 106 can identify the subnet that the client device is hosted on, and access data that indicates the client type that should be hosed on that subnet. The data recording the client device's type, or a subset of that data, is compared to data that indicates the client type that should be on the subnet.

If the gateway 106 determines that the client types match (318), the gateway can assign the policy of the subnet to the client (320). For example, the gateway can issue one or more messages to the client device 112 instructing the client device to update its settings with one or more policies. Additionally or alternatively, the gateway 106 can update data that records the policies that apply to the client device 112.

If the gateway 106 determines that the client types do not match (320), the gateway can apply corrective action (322). For example, the gateway 106 can reassign the client device 112 to a different subnet, remove the client device 112 from the network 100, and/or generate a message that identifies the client device 112 as being hosted on the wrong subnet.

The client device 112 can update its settings (324). For example, if the client device 112 is issued new policies, it may update its software according to those new policies. If the client device 112 is removed from the network 100, it may update its network indicator to show that it is no longer on the network 100.

Figure 4:
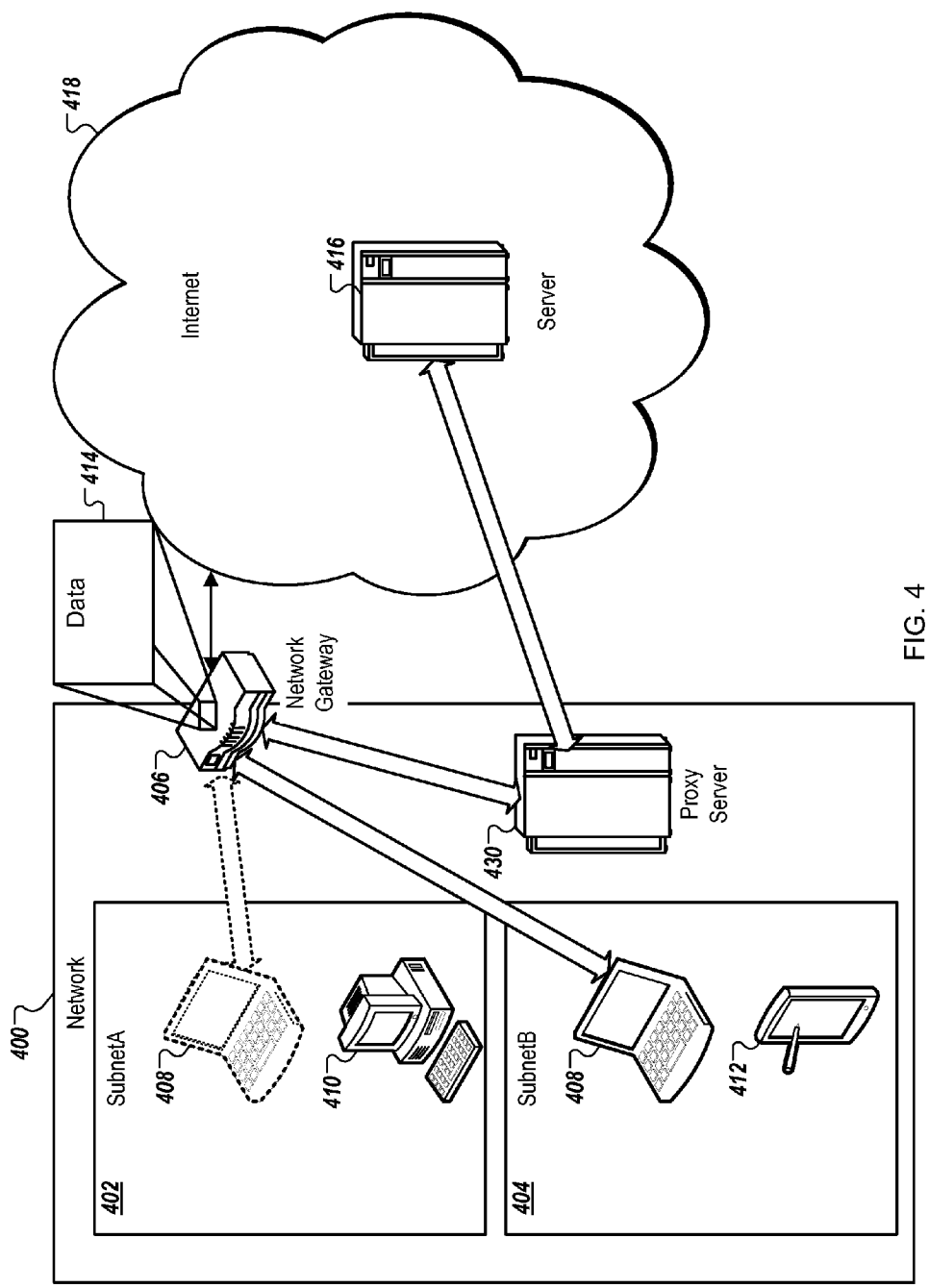
FIG. 4 is a block diagram of an example network with devices on different subnets.

FIG. 4 is a block diagram of an example network 400 with devices on different subnets. The network 400 includes subnets 402 and 404, a network gateway 406, client devices 408-412, which represents any appropriate computing devices capable of browsing resources inside or outside of the network 400, and a proxy server 430, which represents any appropriate computing device capable of acting as a proxy of another server or resource within or outside of the network 400. While not shown for clarity's sake, the network 400 can include other elements including, but not limited to, wireless and/or wired access points, file and/or application servers, routers, and network cables, as well as additional client devices and network gateways.

The gateway 406 can include a plurality of hardware devices, each of which includes a separate sensor and memory unit. For example, one hardware device may be configured to route traffic into and out of the network 400, and another hardware device may be configured to monitor the traffic for use in identifying client types. The gateway 406 may be contained in a single unit such as a free-standing server or may have a modular design such as multiple devices mounted on a server rack and connected by external cabling.

The gateway 406 may be managed by a single user interface that provides a user with tools to configure and administer the network 400. These administrative tools include, but are not limited to, tools to configure the subnets 402 and 404 and to route traffic from client devices 408-412 through the proxy server 430 in order to actively monitor the traffic of the client devices 408-412. While the proxy server 430 is shown as a network server that is separate from the gateway 406, other configurations are possible. For example, the proxy server 406 may be one of the plurality of hardware devices contained by the network gateway 406, it may be a virtual server hosted by the gateway 406 or another computer, and/or may be a gateway of the network 400.

The client device 408 is a client device of a type that conflicts with the type associated with the subnet 402 in the data 414. When the client device 408 attempts to access a resource on the server 416 on the Internet 418 or within the network 400, the gateway can actively monitor the traffic to create a traffic profile for the client device 108. To actively monitor the traffic, the gateway 406 can redirect the client device 408 to the proxy server 430, which can be configured to simulate the server 416. Any appropriate type of redirect is possible, including but not limited to 402 HTTP redirect, server-side scripting, frame redirects, and Apache mod_rewrite.

The gateway 406 can be configured to transparently route the redirected traffic to the redirected traffic's original destinations: the server 406 and the client device 408. Additionally, the gateway 406 can be configured to modify the traffic so that the gateway 406 and/or the proxy server 430 are able to determine the client device's 408 type. For example, the proxy server 430 can inspect parameters of the traffic such as the cookies contained in messages from the client device 408. Additionally or alternatively, the proxy server 430 can generate or modify messages sent to the client device 408. For example, the proxy server 430 may issue a request to the client device 408 that only some types of clients are configured to respond to, or that has a response that would identify the type of the client 408.

In this example, the subnet 402 is configured to host computers that access sensitive data on the network 400 (e.g., customer's personal data, software source code, medical records). Access to the data is, by default, denied unless the requesting device is subject to security policy granting access. The gateway 406 is configured to determine if the client devices on the subnet 402 meet the required type and, if so, issue the policy to the client device.

To determine if the client device 408 should be issued the policy, the network gateway redirects the network traffic of the client device 408 to the proxy server 430. The proxy server issues a request to the client device 408 that requests verification that a particular piece of monitoring software is installed on the client device 408. The client device 408 does not have this particular piece of software installed, and fails to respond to the proxy server 430 correctly. Based on this result, the proxy server 430 and/or the gateway 406 determine that the client device 408 does not match the requirements of the subnet 402. In response, the gateway 406 reassigns the client device 408 from the subnet 402 to the subnet 404.

Figure 5:
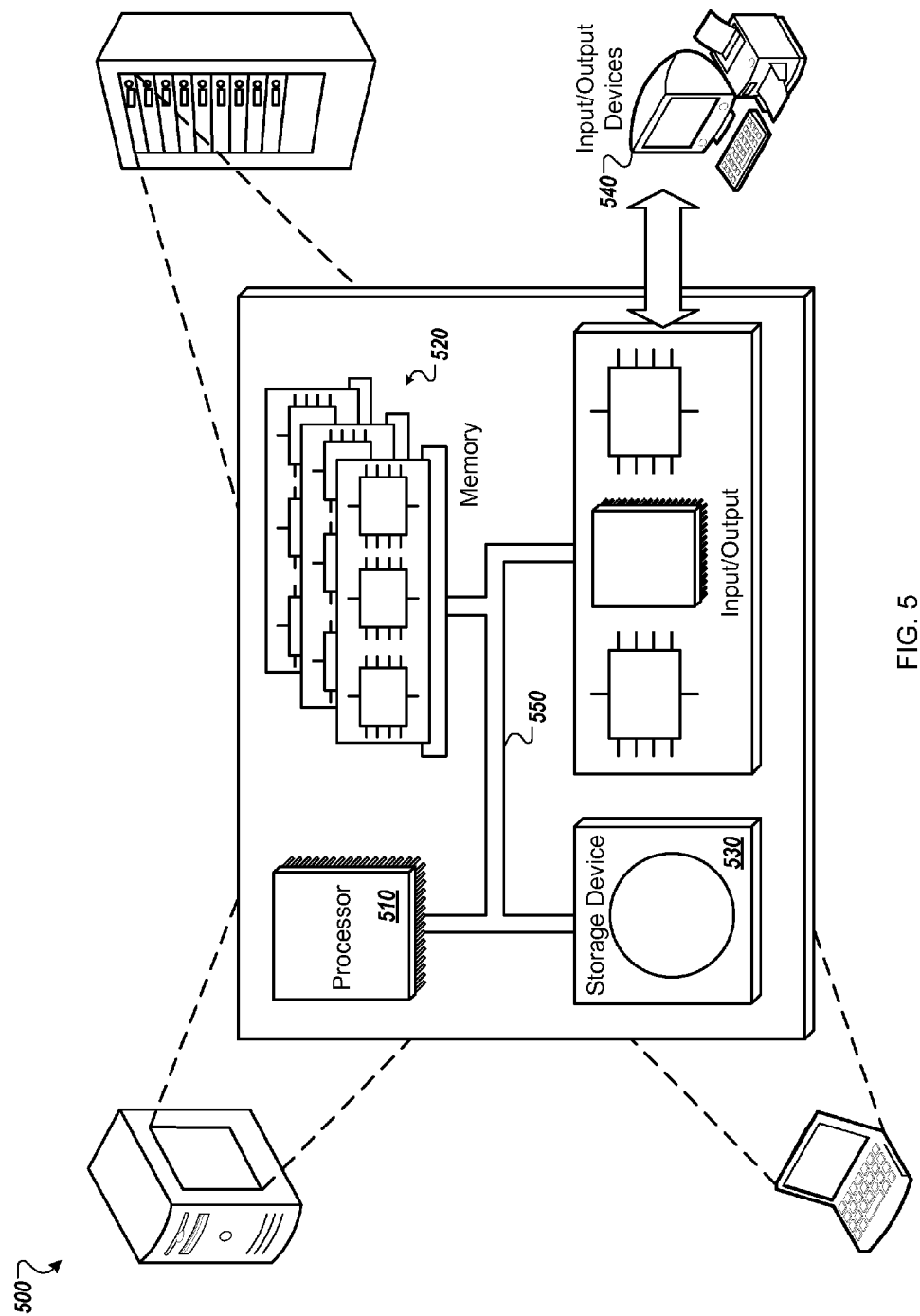
FIG. 5 is a schematic diagram that shows an example of a computing device and a mobile computing device.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures and privacy settings are available options to be used to ensure user security and privacy are respected.

What is claimed is:

1. A method performed by a data apparatus, the method comprising:
    maintaining associations among a plurality of subnets of a network, a plurality of policies, and a plurality of client types, wherein each subnet has an associated client type and an associated policy;
    determining, for a particular client device, (i) a client type of the particular client device, and (ii) a client type associated with the subnet on which the particular client device is hosted;
    comparing, for the particular client device, (i) the determined client type of the particular client device with (ii) the determined client type associated with the subnet on which the particular client device is hosted;
    responsive to a determination that the client type of the particular client device does not match the client type associated with the subnet that hosts the particular client device, applying, to the particular client device, a corrective action; and
    wherein the corrective action comprises moving the particular client device to a different subnet.

2. The method of claim 1, wherein the corrective action further comprises one of the group consisting of generating an alert that identifies the particular client device, redirecting a request from the particular client device to a webpage, and blocking access to the subnet.

3. The method of claim 1, wherein maintaining associations among a plurality of subnets of a network, a plurality of policies, and a plurality of client types comprises maintaining associations among a plurality of subnets of a network, a plurality of policies, and a plurality of client types and a plurality of parameters, wherein each client type has an associated parameter; and
    wherein determining, for a particular client device, (i) a client type of the particular client device, and (ii) a client type associated with the subnet on which the particular client device is hosted comprises:
        passively monitoring network traffic of the client devices;

examining a parameter of the passively monitored network traffic; and comparing the parameter of the passively monitored network traffic with the associated parameters of the client types of the maintained associations.

4. The method of claim 3, wherein the parameter of the passively monitored network traffic is a User-Agent header.

5. The method of claim 1, wherein determining, for a particular client device, (i) a client type of the particular client device, and (ii) a client type associated with the subnet on which the particular client device is hosted comprises:

redirecting at least some network traffic of the client devices to a server on the network;

receiving, at the server on the network, the redirected traffic; and examining a parameter of the redirected traffic.

6. The method of claim 5, wherein the parameter of the redirected traffic is a cookie.

7. The method of claim 5, wherein the server is a transparent proxy configured to transparently route the redirected traffic to the redirected traffic's original destination.

8. The method of claim 1, wherein:

the network includes a first subnet and a second subnet;
stationary clients are associated with the first subnet;
bring-your-own-device clients are associated with the second subnet; and
a more restrictive policy is associated with the second subnet and a less restrictive policy is associated with the first subnet.

9. The method of claim 1 wherein the data apparatus comprises a plurality of hardware devices, each hardware device include a separate processor and memory unit;

wherein a first hardware device is configured to route traffic to and from the client devices into and out of the network; and wherein a second hardware device is configured to perform the steps of:

maintaining associations among a plurality of subnets of a network, a plurality of policies, and a plurality of client types, wherein each subnet has an associated client type and an associated policy;

determining, for a particular client device, (i) a client type of the particular client device, and (ii) a client type associated with the subnet on which the particular client device is hosted;

comparing, for the particular client device, (i) the determined client type of the particular client device with (ii) the determined client type associated with the subnet on which the particular client device is hosted; and responsive to a determination that the client type of the particular client device matches the client type associated with the subnet that hosts the particular client device, applying, to the particular client device, the policy associated with the subnet that hosts the particular client device.

10. A non-transitory computer storage media encoded with computer program instructions that, when executed by one or more processors, cause a computer device to perform operation comprising:

maintaining associations among a plurality of subnets of a network, a plurality of policies, and a plurality of client types, wherein each subnet has an associated client type and an associated policy;

determining, for a particular client device, (i) a client type of the particular client device, and (ii) a client type associated with the subnet on which the particular client device is hosted;

comparing, for the particular client device, (i) the determined client type of the particular client device with (ii) the determined client type associated with the subnet on which the particular client device is hosted;

responsive to a determination that the client type of the particular client device does not match the client type associated with the subnet that hosts the particular client device, applying, to the particular client device, a corrective action; and wherein the corrective action comprises moving the particular client device to a different subnet.

11. The computer storage media of claim 10, wherein maintaining associations among a plurality of subnets of a network, a plurality of policies, and a plurality of client types comprises maintaining associations among a plurality of subnets of a network, a plurality of policies, and a plurality of client types and a plurality of parameters, wherein each client type has an associated parameter; and wherein determining, for a particular client device, (i) a client type of the particular client device, and (ii) a client type associated with the subnet on which the particular client device is hosted comprises:

passively monitoring network traffic of the client devices;
examining a parameter of the passively monitored network traffic; and
comparing the parameter of the passively monitored network traffic with the associated parameters of the client types of the maintained associations.

12. The computer storage media of claim 10, wherein determining, for a particular client device, (i) a client type of the particular client device, and (ii) a client type associated with the subnet on which the particular client device is hosted comprises:

redirecting at least some network traffic of the client devices to a server on the network;
receiving, at the server on the network, the redirected traffic; and
examining a parameter of the redirected traffic.

13. The computer storage media of claim 12, wherein the server is a transparent proxy configured to transparently route the redirected traffic to the redirected traffic's original destination.

14. The computer storage media of claim 10, wherein the corrective action further comprises one of the group consisting of generating an alert that identifies the particular client device, redirecting a request from the particular client device to a webpage, and blocking access to the subnet.

15. A system comprising:

one or more processors configured to execute computer program instructions; and
computer storage media encoded with computer program instructions that, when executed by one or more processors, cause a computer device to perform operation comprising:

maintaining associations among a plurality of subnets of a network, a plurality of policies, and a plurality of client types, wherein each subnet has an associated client type and an associated policy;

determining, for a particular client device, (i) a client type of the particular client device, and (ii) a client type associated with the subnet on which the particular client device is hosted;

comparing, for the particular client device, (i) the determined client type of the particular client device with (ii) the determined client type associated with the subnet on which the particular client device is hosted;

responsive to a determination that the client type of the particular client device does not match the client type associated with the subnet that hosts the particular client device, applying, to the particular client device, the policy associated with the subnet that hosts the particular client device, a corrective action; and wherein the corrective action comprises moving the particular client device to a different subset.

16. The system of claim 15, wherein maintaining associations among a plurality of subnets of a network, a plurality of policies, and a plurality of client types comprises maintaining associations among a plurality of subnets of a network, a plurality of policies, and a plurality of client types and a plurality of parameters, wherein each client type has an associated parameter; and wherein determining, for a particular client device, (i) a client type of the particular client device, and (ii) a client type associated with the subnet on which the particular client device is hosted comprises:

passively monitoring network traffic of the client devices;

examining a parameter of the passively monitored network traffic; and comparing the parameter of the passively monitored network traffic with the associated parameters of the client types of the maintained associations.

17. The system of claim 15, wherein determining, for a particular client device, (i) a client type of the particular client device, and (ii) a client type associated with the subnet on which the particular client device is hosted comprises:

redirecting at least some network traffic of the client devices to a server on the network;

receiving, at the server on the network, the redirected traffic; and examining a parameter of the redirected traffic.

18. The system of claim 17, wherein the server is a transparent proxy configured to transparently route the redirected traffic to the redirected traffic's original destination.

19. The system of claim 15, wherein the corrective action further comprises one of the group consisting of generating an alert that identifies the particular client device, redirecting a request from the particular client device to a webpage, and blocking access to the subnet.

* * * * *